(12) United States Patent
Havlir et al.

(10) Patent No.: US 9,785,567 B2
(45) Date of Patent: Oct. 10, 2017

(54) OPERAND CACHE CONTROL TECHNIQUES

(71) Applicant: Apple Inc., Cupertino, CA (US)

(72) Inventors: Andrew M. Havlir, Orlando, FL (US);
Terence M. Potter, Austin, TX (US);
Liang-Kai Wang, Austin, TX (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 14/851,859

(22) Filed: Sep. 11, 2015

(65) Prior Publication Data
US 2017/0075810 A1    Mar. 16, 2017

(51) Int. Cl.
| G06F 12/00 | (2006.01) |
| G06F 13/00 | (2006.01) |
| G06F 13/28 | (2006.01) |
| *G06F 12/0884* | (2016.01) |
| *G06F 12/0846* | (2016.01) |
| G06F 9/38 | (2006.01) |
| G06F 9/30 | (2006.01) |

(52) U.S. Cl.
CPC ...... *G06F 12/0884* (2013.01); *G06F 12/0848* (2013.01); *G06F 9/3012* (2013.01); *G06F 9/3834* (2013.01); *G06F 9/3838* (2013.01); *G06F 9/3859* (2013.01); *G06F 2212/604* (2013.01)

(58) Field of Classification Search
CPC ............. G06F 12/0848; G06F 12/0884; G06F 9/3012; G06F 9/3834; G06F 9/3859; G06F 9/3838; G06F 2212/604
USPC ....... 711/140, 144, 155; 712/E9.023, E9.027
See application file for complete search history.

(56) References Cited

U.S. PATENT DOCUMENTS

| 6,289,417 | B1 | 9/2001 | Larri | |
| 2004/0225838 | A1* | 11/2004 | Biles | ................... G06F 9/30098 711/118 |
| 2005/0289299 | A1 | 12/2005 | Nunamaker et al. | |
| 2008/0022044 | A1 | 1/2008 | Nunamaker et al. | |
| 2011/0161593 | A1 | 6/2011 | Yamazaki | |
| 2012/0047329 | A1 | 2/2012 | Goel et al. | |

(Continued)

FOREIGN PATENT DOCUMENTS

| EP | 0717359 | 6/1996 |
| TW | 201015318 | 4/2010 |
| WO | 9003001 | 3/1990 |

*Primary Examiner* — Tuan Thai
*Assistant Examiner* — Shane Woolwine
(74) *Attorney, Agent, or Firm* — Meyertons, Hood, Kivlin, Kowert & Goetzel, P.C.

(57) ABSTRACT

Techniques are disclosed relating to per-pipeline control for an operand cache. In some embodiments, an apparatus includes a register file and multiple execution pipelines. In some embodiments, the apparatus also includes an operand cache that includes multiple entries that each include multiple portions that are each configured to store an operand for a corresponding execution pipeline. In some embodiments, the operand cache is configured, during operation of the apparatus, to store data in only a subset of the portions of an entry. In some embodiments, the apparatus is configured to store, for each entry in the operand cache, a per-entry validity value that indicates whether the entry is valid and per-portion state information that indicates whether data for each portion is valid and whether data for each portion is modified relative to data in a corresponding entry in the register file.

20 Claims, 7 Drawing Sheets

(56) References Cited

U.S. PATENT DOCUMENTS

2013/0086364 A1    4/2013   Gschwind et al.
2013/0159628 A1    6/2013   Choquette et al.
2013/0246708 A1    9/2013   Ono et al.

* cited by examiner

Operand Cache Entry 400

FIG. 4

State Information 422 for an Operand Cache Entry

OPERAND CACHE CONTROL TECHNIQUES

BACKGROUND

Technical Field

This disclosure relates generally to graphics processing and more specifically to control techniques for a cache for graphics operands.

Description of the Related Art

Graphics processing units (GPUs) are frequently used to operate on large amounts of data to generate frames of image data for display. The execution of GPU instructions may consume considerable power. GPUs are typically designed to allow a large amount of parallel execution. High power consumption may be problematic, particularly in mobile graphics applications in which a battery is used as a power source.

Graphics operands are often used multiple times in close succession. Using an operand cache between a register file and execution circuitry may reduce power consumption in accessing such operands, e.g., by avoiding multiple accesses to the register file. Managing an operand cache may be challenging, however, in implementations with features such as parallel execution, out-of-order execution, multi-threaded execution, and/or independent control of execution units or groups of execution units, for example.

SUMMARY

Techniques are disclosed relating to per-pipeline control for some aspects of an operand cache.

In some embodiments, an apparatus (e.g., a graphics unit or a computing device that includes a graphics unit) includes a register file and multiple execution pipelines that are configured to perform operations in parallel. In some embodiments, the apparatus also includes an operand cache that includes multiple entries and is configured to store source operands from the register file and result operands of operations by the execution pipelines. In some embodiments, each entry in the operand cache includes multiple portions that are each configured to store an operand for a corresponding execution pipeline.

In some embodiments, the operand cache is configured, during operation of the apparatus, to store data in only a subset of the portions of an entry. In some embodiments, the apparatus is configured to store, for each entry in the operand cache, a per-entry validity value that indicates whether the entry is valid and the apparatus is configured to check for hits in the operand cache based on the per-entry validity values. These per-entry validity values may allow the use of relatively simple matching logic, in some embodiments.

In some embodiments, the apparatus is configured to store, for individual portions of operand cache entries, per-portion state information that indicates whether data for the portion is modified relative to data in a corresponding entry in the register file and whether data for the portion is valid. This per-portion state information may allow independent control of the execution pipelines associated with an operand cache, in some embodiments.

In some embodiments, the apparatus is configured to store per-entry last use values for entries in the operand cache that each indicate whether data in a given entry will be used again. In some embodiments, the apparatus is configured to invalidate a particular entry in response to issuing source operands from the particular entry and determining that the entry's last-use value indicates that the particular entry's data will not be used again. In some embodiments, the apparatus is configured to execute instructions of an instruction set architecture (ISA) that specifies that per-entry last-use values apply to all portions of a given operand cache entry, regardless of the status of the state information corresponding to the portions of the given entry. Storing per-entry last-use information rather than per-portion last use information may reduce circuitry complexity and power consumption, in some embodiments, while still allowing independent control of execution pipelines associated with an operand cache for other functionality, in some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "operand cache entry configured to store multiple operands" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. §112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

DETAILED DESCRIPTION

Graphics Processing Overview

Figure 1A:
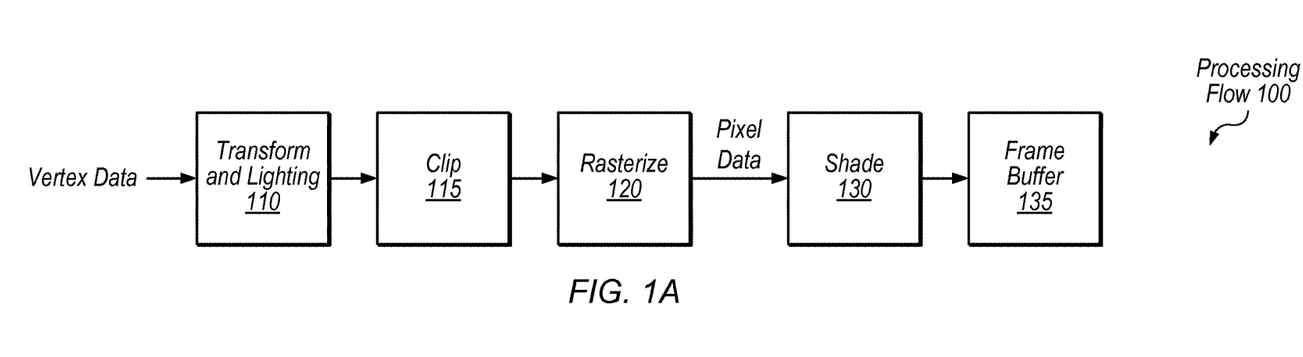
FIG. 1A is a block diagram illustrating an exemplary graphics processing flow.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Figure 1B:
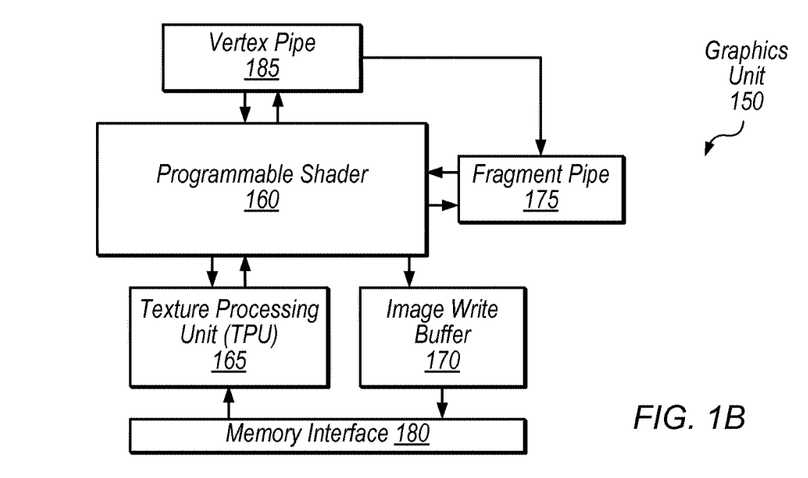
FIG. 1B is a block diagram illustrating one embodiment of a graphics unit.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Operand Cache Overview

Figure 2:
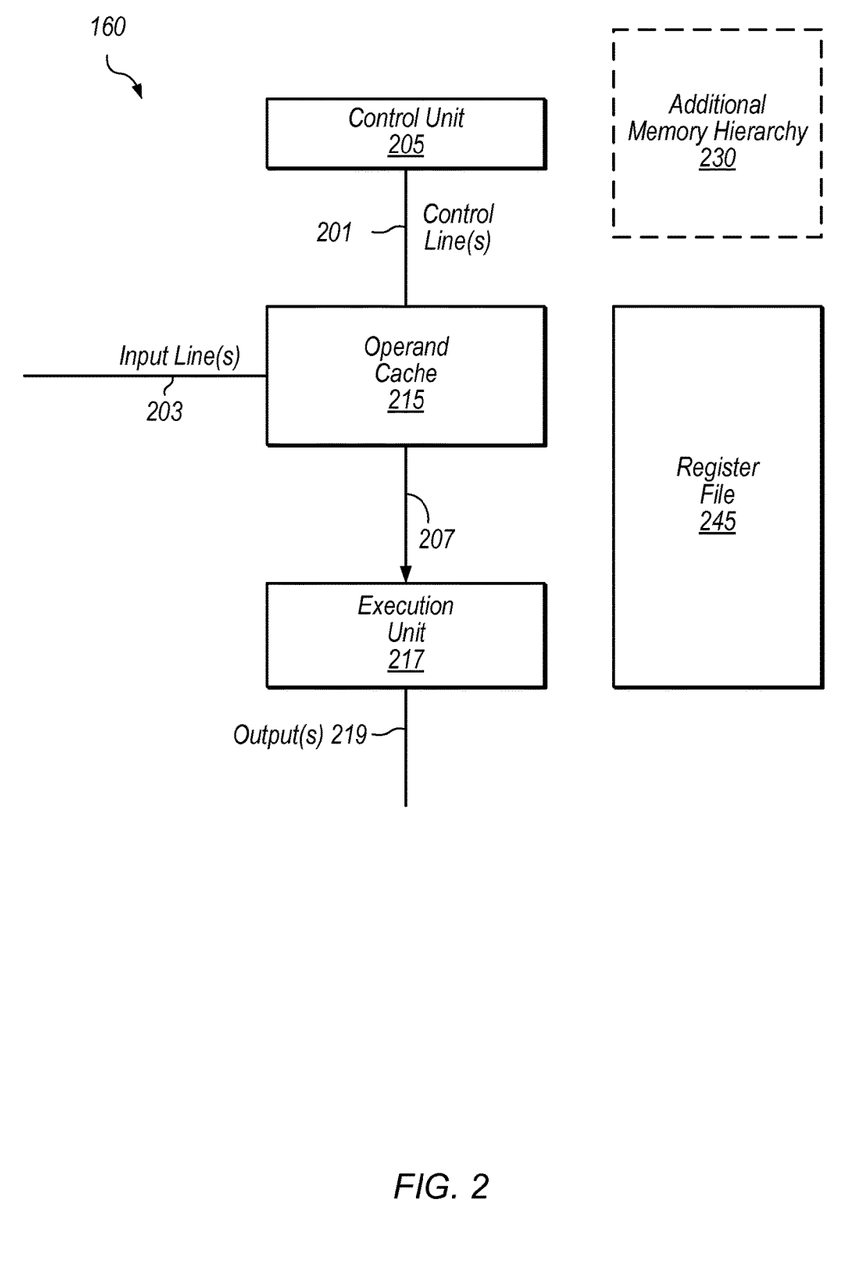
FIG. 2 is a block diagram illustrating a system that includes an operand cache, according to some embodiments.

FIG. 2 is a block diagram illustrating a portion of programmable shader 160 that includes an operand cache 215 and associated structures, according to some embodiments. In some embodiments, one or more structures depicted in FIG. 2 are part of programmable shader 160, but may be located in other portions of a system (e.g., GPU, CPU, scalar and/or vector processing units, etc.) in various embodiments.

The system of FIG. 2 includes control unit 205, operand cache 215, execution unit 217, register file 245, and additional memory hierarchy 230. Control unit 205 is coupled to operand cache 215 via one or more control lines 201 in the embodiment shown. Control lines 201 may transmit control information to and/or receive control information from operand cache 215. Thus, control lines 201 may be used to effect control of reading from and/or writing to operand cache 215 in various embodiments. Additional control lines (not shown) may be used to control all or part of other structures (e.g., register file 245, memory hierarchy 230, etc.) in some embodiments.

In one embodiment, register file 245 is configured to store a plurality of operands for instructions to be executed by execution unit 217. Register file 245 may store operands for a large number (e.g., hundreds, thousands) of threads within a GPU in some embodiments. Thus, in the embodiment of FIG. 2, register file 245 may be implemented as a random access memory (RAM) array. Accordingly, in some embodiments, register file 245 is organized as two or more groups of memory banks, where each of the groups includes one or more memory banks that are configured to store operands. Access to register file 245 (e.g., to read an operand from a memory bank) may be slower and power-inefficient, in some embodiments, when compared to other types of structures that are capable of storing operands (e.g., smaller structures that are comprised of flops and/or latches, such as operand cache 215 in some embodiments). Further, bank conflict stalls may occur even in a multi-banked register file, in various embodiments.

Register file 245 may be a single-instruction, multiple data register file (e.g., a wide SIMD structure that is expensive to access in terms of power consumption) in some embodiments. For example, reading from register file 245 may require reading multiple operands in one embodiment. Thus, as described below, operand caching may be even more beneficial when register file 245 is a wide SIMD structure, in at least one embodiment.

In various embodiments, register file 245 may receive various data and/or control information from control unit 205, and operands from memory hierarchy 230. For example, in one embodiment, memory hierarchy 230 may transmit operands to register file 245, while control unit 205 transmits control information (although various configurations are possible, and control information and/or operands may be transmitted by other structures in some embodiments).

In the embodiment of FIG. 2, memory hierarchy 230 includes storage structures that may hold operand data (and/or other data, control information, etc.). Accordingly, in some embodiments, memory hierarchy 230 includes one or more of any or all of the following: L1 cache, L2 cache, L3 cache, additional register files and/or operand caches, storage devices such as flash memory, hard drives, static RAM devices, etc. Memory hierarchy 230 may include operands generated from various functional units (e.g., execution units, memory units, etc.) in different embodiments. In one embodiment, memory hierarchy 230 therefore includes one or more additional register files that are configured to provide operands to one or more additional operand caches and/or one or more additional execution units (not shown). These structures may be arranged in a hierarchy in various embodiments such that a deeper layer in the hierarchy will have more storage capacity, but slower access time. In one embodiment, there are be one or more separate register files that are not included in memory hierarchy 230, and that may be used in parallel with register file 245. Furthermore, memory hierarchy 230 is configured to interact with operand cache 215 in the embodiment of FIG. 2.

Operand cache 215 is configured to store one or more operands in the embodiment shown, and may help remedy issues associated with register file 245 (e.g., slow access, high power consumption, bank conflicts, etc.) in various embodiments. Operands stored by operand cache 215 may, in various embodiments, be a subset of operands that are stored elsewhere, such as register file 245 and/or additional memory hierarchy 230.

In the embodiment shown, operand cache 215 is smaller in size than register file 245 (and is also smaller than various components of memory hierarchy 230). The smaller size of operand cache 215 may also allow operand cache 215 to consume less power than register file 245 when writing and/or reading an operand. Consider one example in which register file 245 is a 4 MB array of RAM, while operand cache 215 has storage for 32 operands. In such a scenario, it may take an appreciably less amount of time and/or power to access the operand cache vs. the register file. In one embodiment, operand cache 215 is configured to store 10% or less of the amount of operands that register file 245 is configured to store (though this percentage is non-limiting and may vary in other embodiments). In general, operand cache 215 may otherwise have one or more of the properties that one of skill in the art would associate with a cache, in various embodiments.

In the embodiment of FIG. 2, operand cache 215 is configured to receive operands via one or more input lines 203. Input lines 203 may be coupled to one or more data sources in various embodiments in order to receive operands. Data sources from which operands may be received on input lines 203 include register file 245, memory hierarchy 230, outputs of execution unit 217, and outputs of other processing elements, in one or more embodiments. Note that in FIG. 2, and in other figures generally, not all data and/or control paths are necessarily shown. Accordingly, additional communication and/or control pathways (e.g., between operand cache 215, register file 245, memory hierarchy 230, etc.) may be present in any drawing even if not otherwise indicated.

Note that in various embodiments, one or more operands may be stored simultaneously in operand cache 215, register file 245, or another data source (e.g., in memory hierarchy 230). That is, there may be two or more copies of an operand in more than one data structure in some embodiments. Various communication protocols such as cache-control protocols may be employed (e.g., via control unit 205) in such embodiments to ensure that multiple copies of operand values are consistent across different storage locations (e.g., by writing back modified data from operand cache 215, keeping track of a current value of a particular operand, etc.).

As shown, operand cache 215 is configured to provide one or more operands to execution unit 217 via one or more operand lines 207 (which may allow faster operand access time compared with register file 245 and/or memory hierarchy 230). Thus, operand cache 215 is configured to concurrently (e.g., in a same clock cycle or group of two or more clock cycles, depending on the embodiment) provide one or more operands to execution unit 217 via lines 207 in one embodiment. In various embodiments, operand cache 215 may concurrently provide any of various numbers of operands to execution unit 217—for example, in some embodiments, the number of operands that provided from operand cache 215 may depend on an instruction set architecture (ISA). Thus, with an ISA allowing up to four source operands for a given instruction, operand lines 207 may allow up to four operands to be concurrently transmitted to execution unit 217, for example.

Execution unit 217 is configured to execute instructions having an operator (e.g., multiply, add, multiply/add, etc.) and various operands. Thus, execution unit 217 may receive operands from operand cache 215, register file 245, and/or other data structures and pathways (though operands received from register file 245 may be received more slowly and at a greater power cost, in some embodiments, when compared with operand cache 215). In some embodiments, execution unit 217 may be pipelined at various depths. After processing by execution unit 217, execution unit 217 is configured to send one or more results (i.e., operand results) via one or more data transmission pathways (outputs) 219 (which may be coupled to operand cache 215, register file 245, memory hierarchy 230, and/or other structures in various embodiments). In some scenarios, one or more operands may be concurrently forwarded from execution unit 217 to two or more other structures.

In some embodiments, execution unit 217 is configured to execute multiple operations in parallel. In these embodiments, each entry in operand cache 215 may store multiple operands and be configured to provide the operands to different pipelines in execution unit 217 for parallel execution. In some embodiments, per-pipeline control allows portions of execution unit 217 to operate independently, e.g., each individual pipeline may be independently enabled or disabled for execution of each instruction. This may allow the different pipelines to execute different paths of instructions.

Still referring to the embodiment of FIG. 2, control unit 205 may transmit and/or receive one or more control signals (that indicate operands to be stored in operand cache 215 or to be provided to execution unit 217, for example). Thus, control unit 205 may control reading from and writing to operand cache 215. Control unit 205 may include various circuitry, and be distributed in various components and/or locations in one or more embodiments (e.g., a portion of control unit 205 may be located within operand cache 215, a decode unit, attached to one or more control signal or data pathways, etc.). All or a portion of control unit 205 may be located in operand cache 215, an execution pipeline of shader 160, or any other element of shader 160 that may be configured to communicate control signal(s) (such as an instruction decode unit), in one or more embodiments. In other words, control unit 205 is not limited to the location(s) shown in FIG. 2.

In other embodiments, control unit 205 may include an operand cache controller (not depicted) that controls operand cache 215. Such an operand cache controller in control unit 205 may indicate the tags and states (e.g., replacement state) of storage lines/entries; decide whether a cache hit or miss has occurred; and/or control when reads and writes to operand cache 215 occur. In one embodiment, operand cache 215 simply contains data storage, and in this embodiment, states, tags, and other information may be maintained by control unit 205 (for example, by an operand cache controller within control unit 205). Accordingly, in various embodiments, cache consistency, validity, dirty bits, tags, and/or other information regarding operand cache 215 may be maintained and updated by control unit 205.

Structures and techniques discussed with reference to FIG. 2, and generally with regard to other figures herein, may be adapted or configured for use in multi-threading environments in various embodiments. Multiple threads may operate in parallel, for example, during different clock cycles and/or during the same clock cycle using different hardware. In some embodiments, execution unit 217 performs computations for multiple threads that produce several operand results to be communicated via one or more transmission pathways 219.

For example, instructions may be assigned to a "SIMD group" or "thread group" (these terms are used interchangeably herein) to be executed using N execution pipelines in parallel (i.e., such that each of the instructions is executed in parallel by N different execution modules using potentially different input data, e.g., for different pixels on a screen). Instructions belonging to a given thread group may execute the same program, but for different input data. Thus, execution pipelines may execute the instruction R1=R2+R3 in parallel for multiple different threads in a thread group, using different input data belonging to each thread stored in different instances of a register R2.

Exemplary Data Path Circuitry

Figure 3:
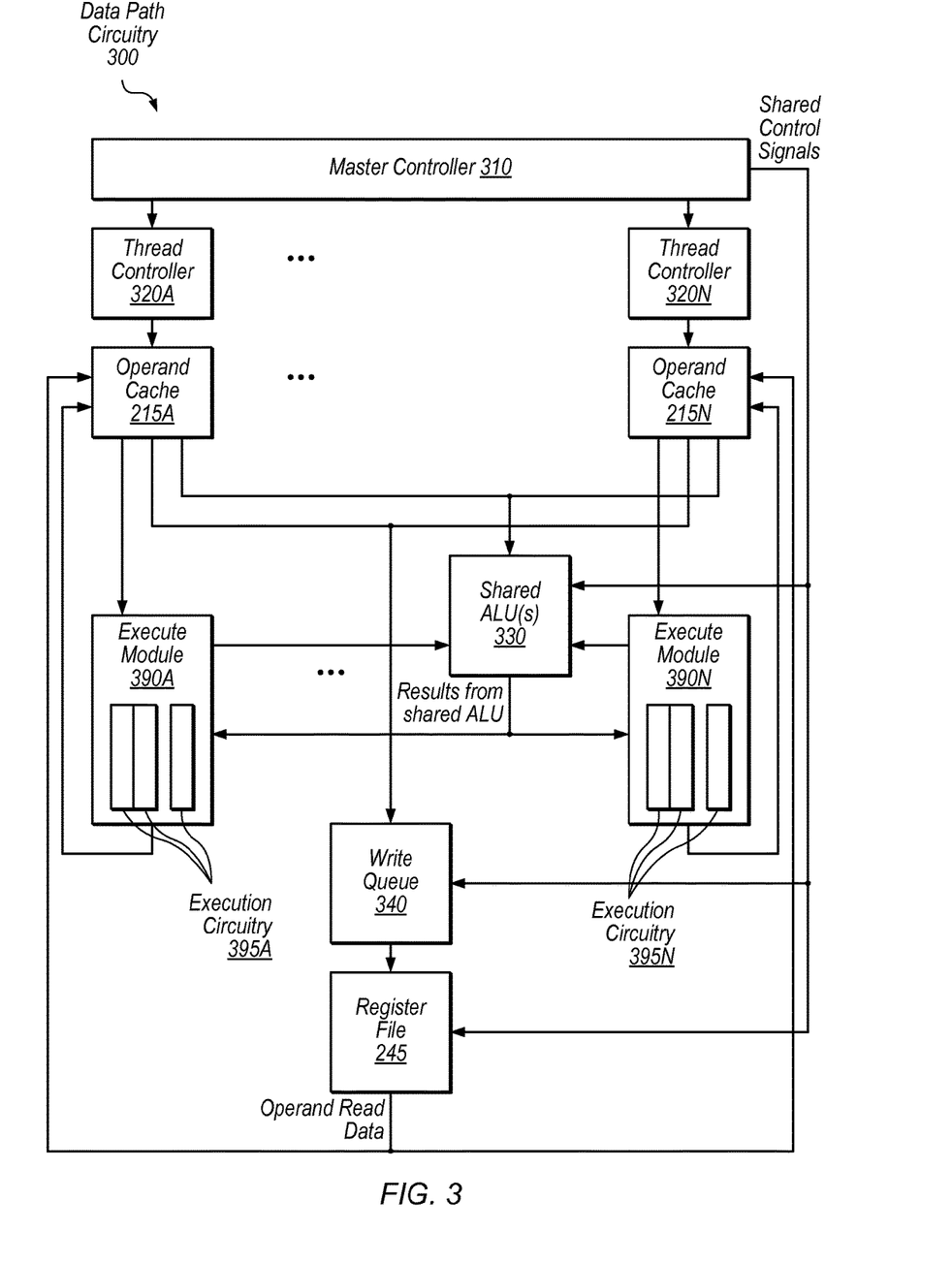
FIG. 3 is a block diagram illustrating data path circuitry that includes operand caches each configured to store operands for multiple execution pipelines, according to some embodiments.

FIG. 3 is a block diagram illustrating exemplary data path circuitry 300 that includes operand caches, according to some embodiments. In the illustrated embodiment, data path circuitry 300 includes master controller 310, thread controllers 320A-N, operand caches 215A-N, shared arithmetic logic unit(s) (ALU(s)) 330, execute modules 390A-N, write queue 340, and register file 245.

In some embodiments, instructions generally traverse through several stages, including: operand cache allocation, source gathering, ALU execution, result write back, and instruction completion. In some embodiments, programmable shader 160 is configured to perform operand cache allocation and instruction completion in program order while allowing other stages to occur out of program order. This may improve performance in source gathering, ALU execution, and result write back, in some embodiments, by allowing younger instructions to proceed when they are not dependent on older instructions, rather than waiting in program order. Enforcing in-order operand cache allocation and instruction completion may ensure correct program execution, in some embodiments.

Operand caches 215 may be configured as described above with reference to FIG. 2. In the illustrated embodiment, operand caches 215 are configured to provide operands to shared ALU(s) 330, execute modules 390, write queue 340 (e.g., for storage in register file 245), and/or other processing elements (not shown). In some embodiments, operand caches 215 are configured to receive operands (some connections not explicitly shown) from register file 245, execute modules 390, shared ALU(s) 330, and/or other processing elements. In the illustrated embodiment, there is a one-to-one correspondence between operand caches and execute modules, but in other embodiments multiple operand caches may be implemented for a given execute module, e.g., to reduce operand cache access times.

Master controller 310, in the illustrated embodiment, is configured to receive thread groups to execute and assign thread groups to a thread controller 320 and operand cache 215. In the illustrated embodiment, master controller 310 is configured to provide control signals to the individual thread controllers as well as shared controller signals to shared ALU(s) 320, write queue 340, and register file 245.

Thread controllers 320, in the illustrated embodiment, are configured to monitor and control various information relating to the respective operand caches 215. In some embodiments, thread controllers 320 are configured to perform functionality described above with reference to the control unit 205 of FIG. 2.

Execute modules 390, in some embodiments, are configured to perform 16-bit arithmetic while shared ALU(s) 330 are configured to perform 32-bit arithmetic. In other embodiments, these elements may perform operations of various widths, with shared ALU(s) 330 having a greater width than execute modules 390. Using one or more shared ALUs may reduce processor area while maintaining performance in situations where a relatively small number of 32-bit arithmetic instructions are executed, for example. In other embodiments, data path circuitry 300 may not include shared ALUs. In some embodiments, execute modules 390 are configured similarly to execution unit 217 of FIG. 2. In some embodiments, each execute module 390 is configured to execute a SIMD group, and therefore may be configured to perform operations in parallel for multiple threads of a SIMD group at once. In the illustrated embodiment, execute modules 390 each include multiple instances of execution circuitry 395, which may also be referred to as "execution pipelines." In these embodiments, the execute module 390 is configured to perform the same operations for threads in the SIMD group. Each instance of execution circuitry 395 may include multiple pipeline stages. Shared ALU(s) 330, in some embodiments, may similarly include multiple instances of execution circuitry (not shown).

In some embodiments, individual control of execution circuitry instances means that some execution pipelines in an execute module 390 will be unused during certain operating situations, e.g., when a SIMD group has a smaller number of active threads than the execute module 390 is configured to support. In some embodiments, predication information in program instructions indicates which instances of execution circuitry 395 are active. For example, in some embodiments, branch predication is used such that all possible branch paths are coded inline. Each instance may be associated with a predicate and a given instruction may be executed only for the instances whose predicate is true. In some embodiments, predicate values for each instance may be changed by a set of conditional instructions. Thus, in some embodiments, within a given thread group, some threads may be predicated on at the same time that others are predicated off.

In the illustrated embodiment, execute modules 390 and shared ALU(s) 330 are configured to write results to operand caches 215, and the results are eventually written to write queue 340 and register file 245. In some embodiments, all result operands are written to an operand cache 215, even though they may not be used again before being flushed back to the register file (e.g., they may be quickly invalidated). This may reduce power consumption required for control signals, in some embodiments, relative to using separate control signals to indicate whether each result should be stored in an operand cache.

Write queue 340, in the illustrated embodiment, is configured to store operands to be written to register file 245. In embodiments in which registers are split into multiple portions and/or register file 245 includes multiple banks, write queue 340 may aggregate and control writes to register file 245 to reduce the overall number of required accesses and/or avoid bank conflicts when writing data to register file 245.

Register file 245 may be configured as described above with reference to FIG. 2, in some embodiments. In some embodiments, data path circuitry 300 is arranged such that data cannot be directly supplied from register file 245 to execute modules 390. In such embodiments, operand read data read from register file 245 is provided to an operand cache 215 which is configured to provide the data in turn to a corresponding execute module 390.

Further, in some embodiments, data path circuitry 300 is arranged such that results from execute modules 390 cannot be directly supplied to register file 245. In these embodiments, result operands from execute modules 390 are provided to an operand cache 215 which then writes the operand data to register file 245. Thus, in some embodiments, all operands are allocated an entry in an operand cache 215, even if only for a short duration. This may reduce routing area requirements, reduce power consumption for control signals, etc., in some embodiments.

In other embodiments (not shown), execute modules 390 may be configured to write at least some result operands directly to write queue 340 and/or register file 245 and register file 245 may be configured to provide at least some read operands directly to execute modules 390, without first storing these operands in an operand cache 215.

Data path circuitry 300 is shown for exemplary purposes and is not intended to limit the scope of the present disclosure. The techniques discussed below may be implemented in various operand cache embodiments that may or may not be similar to the configuration of FIG. 3.

Exemplary Operand Cache Entry

Figure 4:
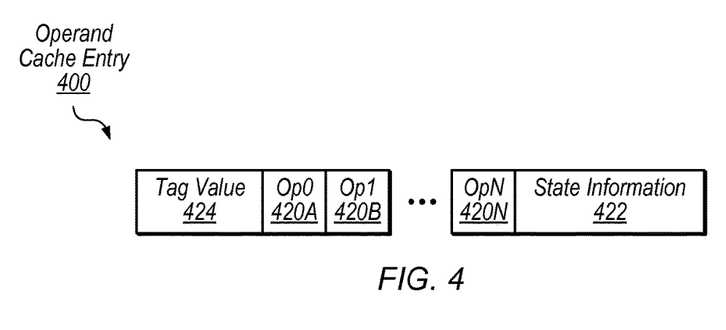
FIG. 4 is a diagram illustrating information stored for an exemplary operand cache entry, according to some embodiments.

FIG. 4 illustrates an exemplary operand cache entry 400. In various embodiments, operand cache 215 includes a plurality of such entries. In the illustrated embodiment, entry 400 includes a tag value 424, multiple operand values op1 through opN 420A-420N, and state information 422. The different operand storage elements configured to store operand values 420 are referred to herein as "portions" of an entry. In some embodiments, the different portions correspond to different execution instances assigned to different execution pipelines. For example, if N pipelines are configured to execute the instruction R1=R2+R3 in parallel for different threads, programmable shader 160 may use the portions 420 of an entry to store the R2 operand for the N different pipelines (and tag value 424 may be usable to indicate that operands corresponding to R2 are stored).

Tag value 424, in the illustrated embodiment, holds tag data that is usable to match an entry in operand cache 215 to a particular instruction, operand, and/or thread. For example, a given tag value 624 may contain information usable to determine that a corresponding operand value 320 corresponds to a particular source operand for a specific program instruction. In some embodiments, the tag value includes a logical address for an operand (e.g., the logical address of a register) and an identifier of the SIMD group that owns the entry. Tag values 424 may be implemented using various techniques known to those with skill in the art, in different embodiments.

In some embodiments, information depicted in operand cache 215 may be maintained (or have a separate copy maintained) in one or more other structures. In one embodiment, for example, tag values 424 are maintained in a separate structure in a decode unit or decode stage of an execution pipeline. Thus, in some embodiments, cache hits and cache misses into operand cache 215 are determined at instruction decode. Copies of operand values may likewise be stored in a register file or other structures (e.g., additional memory hierarchy). Operand cache 215 may also store additional information or include other features not depicted in the embodiment of FIG. 4.

In some embodiments, GPU 150 is configured to generate per-pipeline control information for operand cache 215. In some embodiments, some of the pipelines of a given execute module 390 may perform different operations than other pipelines. Similarly, a portion of the pipelines of a given execute module 390 may be powered off while other pipelines are executing. In these scenarios, in some embodiments, only a subset of the portions 420 of an operand cache entry 400 may be used to store operand data (e.g., for pipelines that are actually using the corresponding register in the register file). As used herein, the term "subset" refers to one or more of the elements in a set, but less than the entirety the elements in the set. For example, when "a subset" of the portions 420 of an operand cache entry are used to store operand data in response to a particular instruction, then at least one portion of the operand cache entry is not used to store operand data in response to the particular instruction.

Therefore, state information 422, in some embodiments, includes both per-entry information and per-portion information, as discussed in further detail below with reference to FIG. 5. The relative amount of per-entry and per-portion information may substantially affect power consumption and the granularity of control over the operand cache 215, in some embodiments.

Exemplary State Information for an Operand Cache

Figure 5:
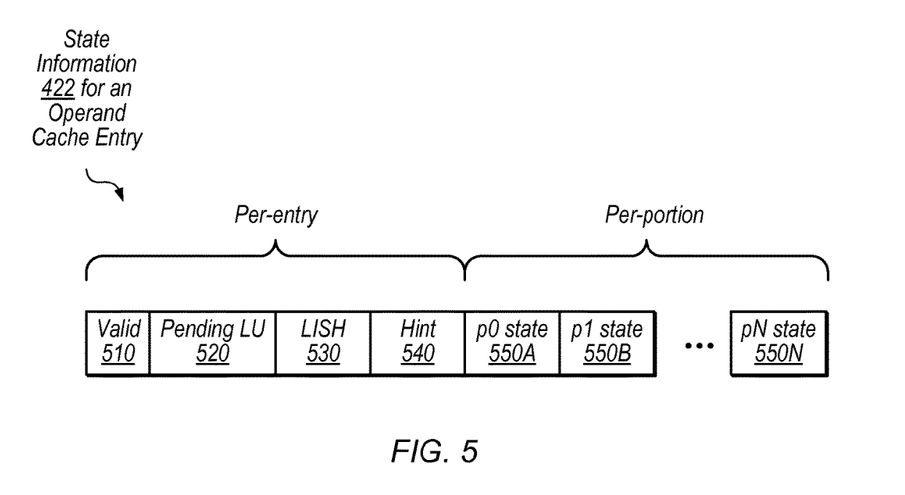
FIG. 5 is a diagram illustrating exemplary state information for an operand cache entry, according to some embodiments.

FIG. 5 illustrates exemplary state information 422 for an operand cache entry 400, according to some embodiments. In the illustrated embodiment, state information 422 includes validity value 510, pending last use (LU) field 520, last instruction source hit (LISH) field 510, hint field 540, and per-portion state fields p0 through pN 550A-550N. In the illustrated embodiment, fields 510, 520, and 540 are specified per-entry and are not specified on a per-portion basis. In the illustrated embodiment, per-portion fields 550A-550N are specified independently for each portion of each relevant entry.

In some embodiments, state information for operand cache 215 is determined at allocation, which is performed in-order. In these embodiments, the state of each operand cache entry is available on allocation, as determined based on all earlier instructions. One exception to the determination of state information on allocation, in some embodiments, is the invalidation of last-use operands, which is discussed in further detail below. For a given instruction at allocation, in some embodiments, programmable shader 160 is configured to always allocate entries in operand cache 215 for source operands before allocating entries for destination operands. This design may allow state information to be properly determined when the same register is used as both a source and a destination (e.g., for the instruction R0=R0+R1), in these embodiments.

In some embodiments, validity information is maintained in both field 510 and fields 550. This may simplify circuitry configured to determine whether there is a hit in operand cache 215 while still allowing per-pipeline control (e.g., when some pipelines are predicated on and others predicated off), in some embodiments.

Valid field 510, in some embodiments, is per-entry information that indicates validity information for a particular entry. In some instances, when valid field 510 is set, this may indicate that at least some of the per-portion state information 550 included in that entry is valid, although this is not necessarily always the case. When valid field 510 is set for an operand cache entry, this indicates that the entry has been allocated but not yet invalidated. Within entries indicated as valid by field 510, per-portion state information 550 is used to determine whether the data in the entry is, in fact, valid.

In some embodiments, valid field 510 is a single bit. For example, if a valid bit is cleared, then the entry is invalid (e.g., not in use) in some embodiments. In some embodiments, programmable shader 160 is configured to determine whether there is a hit for a given entry based on valid field 510 and tag value 424. For example, programmable shader may determine that there is a hit in the operand cache if an entry is valid and has a matching tag (e.g., when the address of the register in register file 245 being accessed matches the tag value 424 for the operand cache entry). Programmable shader 160 may be configured to invalidate entries to make room for new entries based on least-recently-used data, last-use data (e.g., an indication that an operand will not be used again), etc., in some embodiments. Invalid entries may be available to be allocated to new operands, in some embodiments.

As described above, per-portion state fields 550 are also configured to indicate validity information, in some embodiments. In these embodiments, even though a given entry may be marked as valid by valid field 510, not every portion in the entry may store valid data. For example, one or more of the pipelines for which the entry is configured to store operands may be predicated off or may otherwise not be using a register corresponding to operands being stored in the entry. In these embodiments, each instance of state information 550 may indicate whether a corresponding portion is valid.

In some embodiments, state information 550 indicates whether the corresponding operand value 420 is in one of three states: clean, modified, and invalid. In some embodiments, this information is indicated using two bits for each portion. In some embodiments, the clean state indicates that the operand data in the portion is the same as data stored in a corresponding higher-level memory element (e.g., the corresponding register in register file 245). In some embodiments, the modified state indicates that the operand in the operand cache has been modified relative to data in corresponding higher-level memory element (e.g., the corresponding register in register file 245). Data in the modified state may eventually need to be written back to the register file prior to invalidation, for example. The invalid state indicates that the data for that particular portion is not clean and not modified, in some embodiments.

As used herein, in the context of an operand cache with multiple entries each including multiple portions configured to store operands for different execution pipelines, the term "per-entry" refers to information that is maintained at the granularity of an entry and is not independently maintained for different portions of the entry. As discussed above, per-entry state information may be used to determine attributes of portions in a general sense (e.g., valid field 510 may indicate whether at least one portion of the entry is valid), but does not indicate that particular portion definitively has a given attribute (e.g., valid field 510 does not indicate whether p0 state 550A is valid or invalid).

In the same context, the term "per-portion," as used herein, refers to information that is maintained at the granularity of a portion of an entry and is independently maintained for different portions of the entry. For example, per-portion fields 550 may indicate whether each portion of a given entry is valid, clean, or modified. As shown in the example of FIG. 5, some types of information (such as validity information) may be maintained at both per-entry and per-portion granularity. In some embodiments, this split of a particular type of information between per-portion and per-entry may favorably affect the complexity, circuit area, and/or power consumption of programmable shader 160. In various embodiments, the determination of whether to store a type of information on a per-entry or per-portion basis may be a design decision based on operating requirements. In various embodiments, the illustrated per-entry information (and/or other per-entry information not shown) may be maintained per-portion and vice versa, while in some embodiments, such information may be maintained at both per-portion and per-entry granularities.

As used herein, the term "valid" refers to whether data in an entry or portion of an entry in an operand cache is directly usable (that is, without having to read the data from another location, such as from one or more corresponding registers in register file 245). In some embodiments, invalid entries are not checked for cache hits at all. In some embodiments, data from invalid portions of valid entries is not used until data for the portions is fetched from the register file (e.g., a given portion being marked as invalid may indicate that the corresponding register includes information that is more up to date than data in the portion).

For source registers that do not hit in operand cache 215, in some embodiments programmable shader 160 is configured to allocate an entry in operand cache 215 for the source operand(s), read the source operand data from register file 245 for all pipelines for which the entry is configured to store operands (regardless of the execution status of these pipelines, i.e., regardless of whether all the pipelines are using the operand), and store the source operand data in the allocated entry. Reading operand data for all pipelines may reduce overall power consumption, as the extra power to read data for all pipelines may be relatively small and the operands may end up being used eventually, even for pipelines that are not currently using the operand.

For source registers that hit in operand cache 215, in some embodiments, programmable shader 160 is configured to retrieve operand data for any portions of the entry that are indicated as invalid by their corresponding state information 550 and that correspond to pipelines that are using the source register. If pipelines are not using any invalid entries, then no retrieval may be necessary even if they are invalid. For example, if a pipeline is predicated off and its corresponding portion of the entry is invalid, it may be left as invalid, in some situations.

For destination registers that do not hit in operand cache 215, in some embodiments, programmable shader 160 is configured to allocate an entry in operand cache 215 for the destination operand(s). For pipelines that do not use the entry, in some embodiments programmable shader 160 is configured to set state information 550 to indicate that corresponding portions are invalid. For pipelines that do use the entry, in some embodiments programmable shader 160 is configured to set state information 550 to indicate that the corresponding portions are modified.

For destination registers that hit in operand cache 215, in some embodiments, programmable shader 160 is configured to mark entry portions for pipelines that use the entry as modified. In some embodiments, programmable shader 160 may leave state information 550 for other portions of the entry in their current state.

In some embodiments, hint field 540 is used to determine a retention priority for a given entry. In some embodiments, programmable shader 160 is generally configured to evict entries with low retention priority prior to evicting entries with a higher retention priority. In some embodiments, hint field 540 is populated based on a field in an instruction that specifies the corresponding operand associated with operand value 420. In some embodiments, hint information may not be part of an actual instruction, but instead be maintained as separate information associated with the instruction.

In the illustrated embodiment, even though operand cache 215 is configured for independent control of operand cache portions corresponding to different pipelines, hint information is maintained only on a per-entry level and not on a per-portion level. This may reduce the overall amount of state information maintained for operand cache 215.

The exemplary per-entry and per-portion fields of FIG. 5 are discussed herein for exemplary purposes and are not intended to limit the scope of the present disclosure. In various embodiments, a GPU may store additional fields for an operand cache and/or omit one or more of the disclosed fields.

In some embodiments, the only per-portion state information 550 that programmable shader 160 is configured to store for operand cache 215 is information that indicates (1) whether or not a portion is modified and (2) whether or not a portion is valid. This may reduce overall power consumption and area of operand cache 215 (by maintaining other state information for each entire entry rather than for each portion, which may substantially reduce the overall amount of state information), while still allowing per-pipeline control.

Pending LU field 520 and LISH field 530, in some embodiments, are used to quickly invalidate operand cache entries when an instruction is the last use of a particular operand, as described in further detail below.

Exemplary Techniques Relating to Last-Use Information

Still referring to FIG. 5, in some embodiments programmable shader 160 is configured to execute instructions that include last-use information for instruction operands. The last-use information may indicate that a given operand will not be used again and may safely be discarded without writing the operand back to a storage structure (such as an operand cache or register file). During execution of instructions, for example, there may be a number of intermediate operands that are not final results (e.g., a final pixel value). Thus, when a given operand is indicated as "last-use", it need not be retained in an operand cache. For example, for an instruction R1=R2+R3, the instruction may contain a last-use bit for each operand. In this example, the last-use bit for R2 might indicate the last use of the operand corresponding to R2 while the operand for R3 might indicate that that the instruction is not the last use of the operand corresponding to R3. The last-use information may be generated by a compiler, for example.

In some embodiments, programmable shader 160 is configured to set pending LU field 520 for an entry in response to a last-use indication for an operand to be stored in that entry. For the example above, for an entry that is a hit for R2 or is allocated for R2 on a miss, the pending LU field 520 may be set based on a last use indication in the instruction.

In some embodiments programmable shader 160 is configured to store an identifier (e.g., an instruction buffer ID number) in the LISH field 530 of each source register that hits an entry in the operand cache 215. In some embodiments, programmable shader 160 is configured to store this information in LISH field 530 regardless of the status of the pipelines corresponding to the entry (e.g., even if some of the pipelines are turned off or do not use the associated operand).

In some embodiments, when an instruction issues its source operands to execution circuitry (e.g., an execution module 390 of FIG. 3), programmable shader 160 is configured to determine if any entries corresponding to the source operands were marked as pending LU. If so, programmable shader 160 is configured to invalidate the entry, in these embodiments. If so, and if the instruction is the instruction indicated by the LISH field 530 of the entry, programmable shader 160 is configured to invalidate the entry, in these embodiments. Invalidating these entries may improve performance and/or power consumption, e.g., by avoiding flushes to the register file 245 and by making operand cache entries available for other instructions. Checking the LISH field 530 of the entry may ensure that an older instruction with a last-use indication does not invalidate a source operand that a younger instruction needs, in some embodiments.

In some embodiments, if a destination operand hits an entry in operand cache 215 that is marked as pending LU, then the pending LU field 520 is cleared and the state information for pipelines that use the destination operand is set to a modified state. In this case, the entry may be considered to be re-initialized, so there may be no need to invalidate it later. In some embodiments, when a source operand hits an entry that is marked as pending LU, the pending LU field 520 may be cleared. In some embodiments, this situation should not occur, absent compiler error.

In some embodiments, programmable shader 160 is configured to execute instructions of an instruction set architecture (ISA) that specifies that the last-use indication for a given operand applies to all pipelines associated with a corresponding entry, regardless of their status. For example, consider an entry is configured to store operands for N pipelines, but N/2 of the pipelines are turned off. In this example, the valid field for the entry indicates that the entry is valid, and the state information 550 may specify various different states for the N portions corresponding to the N pipelines. Consider, in this example, an instruction R1=R2+R3 that is executed for the N/2 active pipelines where R2 is indicated as being last-use. In response to allocating or hitting the entry for R2, the pending LU field 520 is set and the LISH field 530 stores information indicating the instruction. Subsequently, when the source operands R2 and R3 are provided to an ALU, programmable shader 160 is configured to invalidate the entry based on the pending LU field 520 and LISH field 530. LISH field 530 may be used to verify that, among multiple instructions using the entry, the instruction that causes the invalidation is really the instruction that was the last use of the entry.

Therefore, in these embodiments, the compiler may be configured to set a last-use indication for a given operand only if it is the last-use by every pipeline to which a thread group is assigned. This may reduce complexity and circuit area relative to specifying or using last-use information on a per-pipeline basis.

Figure 6:
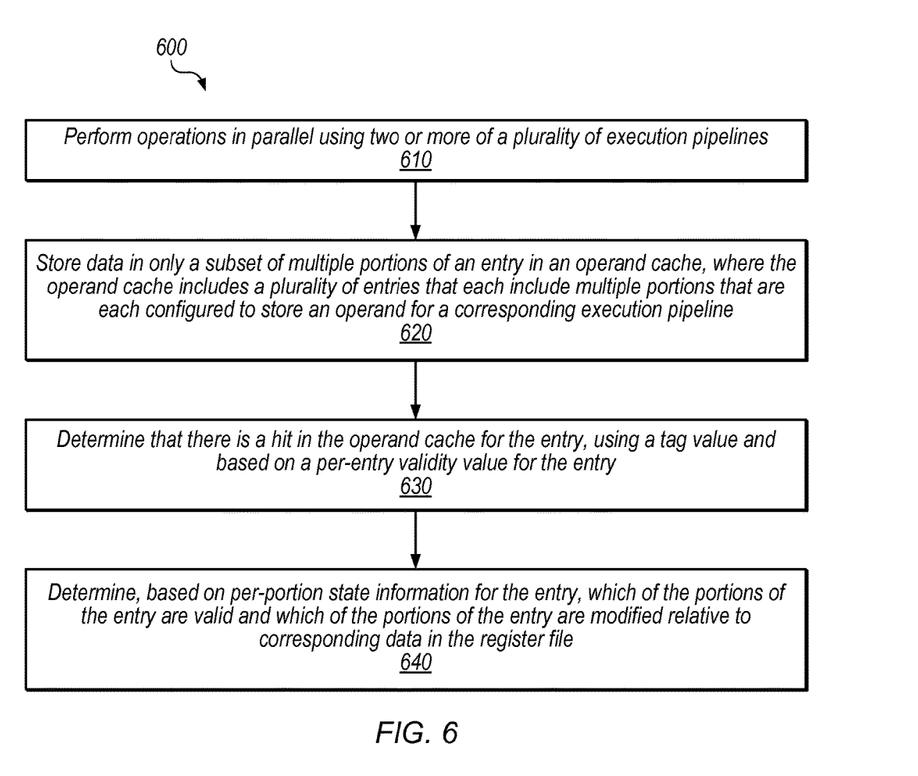
FIG. 6 is a flow diagram illustrating an exemplary method for accessing an operand cache, according to some embodiments.

FIG. 6 is a flow diagram illustrating a method 600 for accessing an operand cache, according to some embodiments. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, in the illustrated embodiment, programmable shader 160 performs operations in parallel using two or more of a plurality of execution pipelines. For example, programmable shader may perform a graphics instruction in parallel using the different instances of execution circuitry 395 in an execute module 390. In some embodiments, the two or more execution pipelines that are used to perform the operations in parallel are only a subset of the execution circuitry 395 in an execute module 390 (the other instances of execution circuitry 395 may be predicated off, for example).

At 620, in the illustrated embodiment, operand cache 215 is configured to store, during operation of a computing device (e.g., graphics unit 150), data in only a subset of multiple portions of an entry in the operand cache. Thus, the storing data in only a subset of multiple portions of the entry means that the storing does not occur for at least one portion of the entry. In these embodiments, the operand cache includes a plurality of entries configured to store source operands from a register file and result operands of operations by the execution pipelines. In these embodiments, each of the entries includes multiple portions (e.g., operand storage elements 420A-420N) and each portion is configured to store an operand for a corresponding one of the execution pipelines.

At 630, in the illustrated embodiment, programmable shader is configured to determine, using a tag value (e.g., tag value 424) and based on a per-entry validity value for the entry (e.g., field 510), that there is a hit in the operand cache for the entry. In some embodiments, this is based on determining that the validity value indicates that the entry is valid and that a provided tag value matches a tag value stored for the entry.

At 640, in the illustrated embodiment, programmable shader 160 is configured to determine, based on per-portion state information for the entry (e.g., fields 550A-550N), which of the portions of the entry are valid and which of the portions of the entry are modified relative to corresponding data in the register file. For example, one or more of the portions may be invalid, one or more of the portions may be clean, and one or more of the portions may be modified, in some embodiments.

Figure 7:
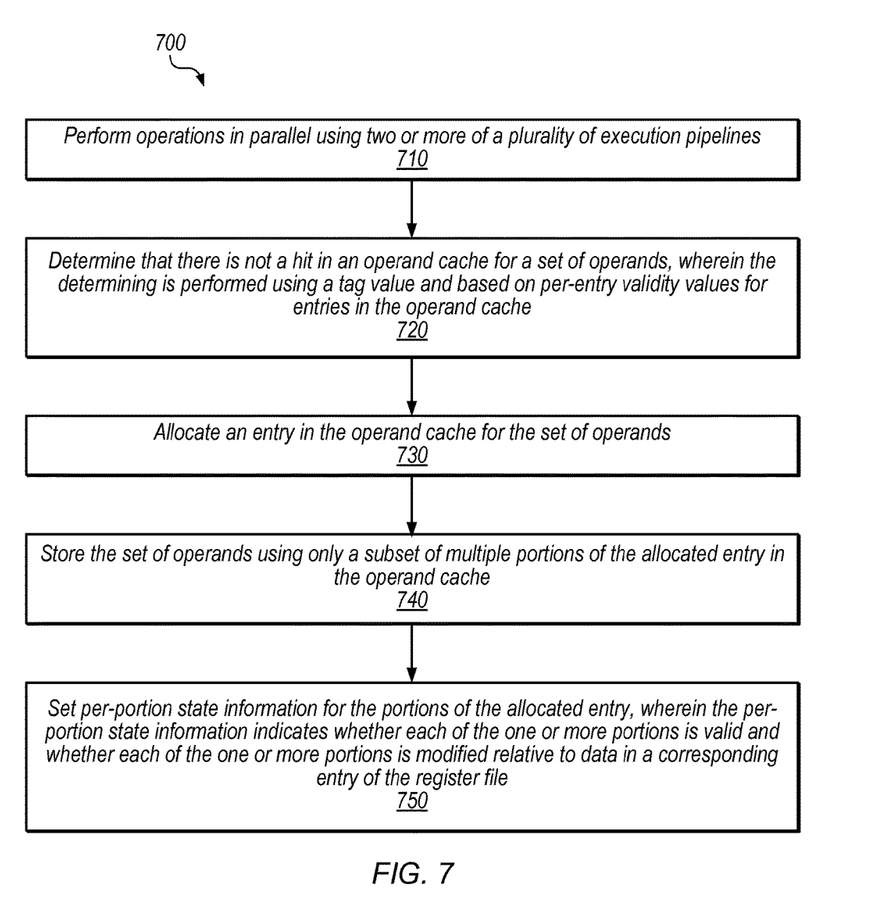
FIG. 7 is a flow diagram illustrating an exemplary method for setting state information for an operand cache entry according to some embodiments.

FIG. 7 is a flow diagram illustrating a method 700 for setting state information for an operand cache entry, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, in the illustrated embodiment, programmable shader 160 performs operations in parallel using two or more of a plurality of execution pipelines. For example, programmable shader may perform a graphics instruction in parallel using the different instances of execution circuitry 395 in an execute module 390. In some embodiments, the two or more execution pipelines that are used to perform the operations in parallel are only a subset of the execution circuitry 395 in an execute module 390 (the other instances of execution circuitry 395 may be predicated off, for example).

At 720, in the illustrated embodiment, programmable shader 160 determines that there is not a hit in an operand cache for a set of operands (e.g., different operands corresponding to a particular register such as R1 for different pipelines), using a tag value (e.g., corresponding to R1 in the above example) and based on per-entry validity values for entries in the operand cache (e.g., valid fields 510). In some embodiments, this may include determining that no valid entries (e.g., as indicated by valid fields 510) have a tag value 424 that matches the provided tag value.

At 730, in the illustrated embodiment, programmable shader 160 is configured to allocate an entry in the operand cache for the set of operands.

At 740, in the illustrated embodiment, programmable shader 160 is configured to store the set of operands using only a subset of multiple portions (e.g., of the operand storage elements 420A-420N) of the allocated entry in the operand cache. In some embodiments, each portion is configured to store an operand for a corresponding one of the execution pipelines.

At 750, in the illustrated embodiment, programmable shader 160 is configured to set per-portion state information (e.g., fields 550A-550B) for portions of the allocated entry to indicate whether each of the one or more portions is valid and whether each of the one or more portions is modified relative to data in a corresponding entry of the register file. In some embodiments, when the operands are destination operands, programmable shader 160 is configured to set the per portion state information to invalid for portions corresponding to execution units that do not perform an operation associated with the destination operands.

Exemplary Device and Computer-Readable Medium

In various embodiments, one or more aspects of the above-described techniques and methods may be implemented as computer-readable instructions stored on any suitable computer-readable storage medium. As used herein, the term computer-readable storage medium refers to a (nontransitory, tangible) medium that is readable by a computing device or computer system, and includes magnetic, optical, and solid-state storage media such as hard drives, optical disks, DVDs, volatile or nonvolatile RAM devices, holographic storage, programmable memory, etc.

Figure 8:
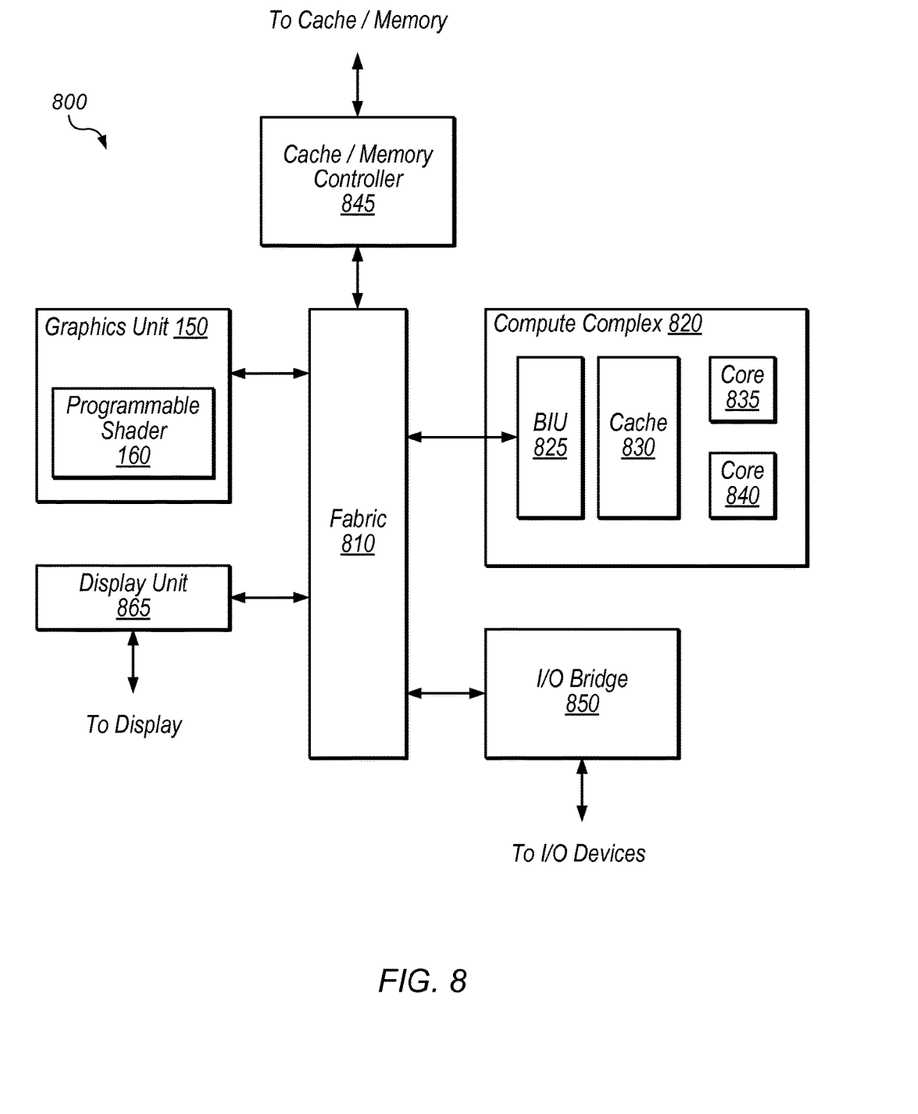
FIG. 8 is a block diagram illustrating one embodiment of a device that includes a graphics unit.

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 150, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 150 may be described as "coupled to" a memory through fabric 810 and cache/memory controller 845. In contrast, in the illustrated embodiment of FIG. 8, graphics unit 150 is "directly coupled" to fabric 810 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of execution pipelines configured to perform operations in parallel;
a register file; and
an operand cache that includes a plurality of entries configured to store source operands from the register file and result operands of operations by the plurality of execution pipelines, wherein the entries include multiple portions and the portions store an operand for a corresponding one of the execution pipelines;
wherein the operand cache is configured, during operation, to store data in a subset of the portions of an entry or in all of the multiple portions of an entry;
wherein the apparatus is configured to store, for each of the plurality of entries, a per-entry validity value, wherein the apparatus is configured to check for hits in the operand cache based on the per-entry validity values; and wherein the apparatus is configured to store, for individual portions of entries of the plurality of entries, per-portion state information that indicates whether data for the portion is modified relative to data in a corresponding entry in the register file and whether data for the portion is valid.

2. The apparatus of claim 1, wherein the apparatus is configured to store state information indicating that a portion of the entry is invalid in response to allocating the entry as a destination entry for an operation performed by only a subset of the plurality of execution pipelines, wherein the apparatus is configured to store the state information indicating that the portion is invalid in response to the execution pipeline not being one of the subset of the plurality of execution pipelines.

3. The apparatus of claim 1, wherein, in response to an access to a portion of the entry that is invalid, the apparatus is configured to read operand data from the register file for at least the portion of the entry.

4. The apparatus of claim 1, wherein the state information that indicates whether data for the portion is modified relative to data in a corresponding entry in the register file and the state information that indicates whether data for the portion is valid is the only state information that the apparatus is configured to store on a per-portion basis.

5. The apparatus of claim 1, wherein the apparatus is configured to store data in only a subset of the portions of the entry based on predication information indicating that a subset of the plurality of execution pipelines are not using the entry.

6. The apparatus of claim 1, wherein the apparatus is configured to store, for each entry of the plurality of entries, a per-entry last-use value that indicates whether data in a given entry will be used again;

wherein the apparatus is configured to invalidate a particular entry in response to issuing source operands from the particular entry and determining that the entry's last-use value indicates that the particular entry's data will not be used again; and wherein the apparatus is configured to execute instructions of an instruction set architecture (ISA) that specifies that per-entry last-use values apply to all portions of a given operand cache entry, regardless of the status of the state information corresponding to the portions of the given entry.

7. The apparatus of claim 1, wherein the apparatus is configured to allocate entries in the operand cache in program order and wherein the apparatus is configured to execute instructions out of program order.

8. A method, comprising:

performing operations in parallel using two or more of a plurality of execution pipelines;

storing, by an operand cache during operation of a computing device, data in a subset of multiple portions of an entry in the operand cache, wherein the operand cache includes a plurality of entries configured to store source operands from a register file and result operands of operations by the execution pipelines, wherein the entries include multiple portions and the portions store an operand for a corresponding one of the execution pipelines;

determining, using a tag value and based on a per-entry validity value for the entry, that there is a hit in the operand cache for the entry; and determining, based on per-portion state information for the entry, which of the portions of the entry are valid and which of the portions of the entry are modified relative to corresponding data in the register file.

9. The method of claim 8, further comprising: storing per-portion information indicating that one or more portions of the entry are invalid in response to allocating the entry as a destination entry for an operation performed by only a subset of the plurality of execution pipelines, wherein the one or more portions correspond to an execution pipeline that is not one of the subset of the plurality of execution pipelines.

10. The method of claim 8, further comprising reading operand data from the register file for a portion of the entry that is indicated as invalid by the per-portion state information.

11. The method of claim 8, further comprising storing data in only a subset of the portions of the entry based on predication information indicating that a subset of the plurality of execution pipelines are not using an operand associated with the entry.

12. The method of claim 8, further comprising:

setting a last-use indication for the entry in response to a last-use indication in an instruction that specifies an operand associated with the entry, wherein the last-use indication is a per-entry last-use indication that applies to the entire entry.

13. The method of claim 12, further comprising:

invalidating the entry by modifying the per-entry validity value for the entry, wherein the invalidating is performed in response to issuing operands from the entry to execution circuitry and is performed based on the per-entry last-use indication.

14. The method of claim 8, wherein the tag value is a per-entry tag value that applies to an entire entry.

15. A method, comprising:

performing operations in parallel using two or more of a plurality of execution pipelines;

determining that there is not a hit in an operand cache of a computing device for a set of operands, wherein the determining is performed using a tag value and based on per-entry validity values for entries in the operand cache;

allocating an entry in the operand cache for the set of operands;

storing the set of operands using a subset of multiple portions of the allocated entry in the operand cache, wherein the operand cache includes a plurality of entries configured to store source operands from a register file and result operands of operations by the execution pipelines, wherein the entries includes multiple portions and the portions store an operand for a corresponding one of the execution pipelines; and setting per-portion state information for the portions of the allocated entry, wherein the per-portion state information indicates whether each of the one or more portions is valid and whether each of the one or more portions is modified relative to data in a corresponding entry of the register file.

16. The method of claim 15, further comprising:

setting the per-entry validity value for the entry to indicate that the entry is valid, based on the allocating;

determining, using a per-entry tag value and based on the per-entry validity value for the entry, that there is a hit in the operand cache for the entry; and determining which of the portions of the entry are valid and which of the portions of the entry are modified based on the per-portion state information.

17. The method of claim 15, wherein the set of operands are destination operands, the method further comprising:

setting the per portion state information to invalid for portions corresponding to execution pipelines that do not perform an operation associated with the destination operands.

18. The method of claim 15, further comprising reading operand data from the register file for a portion of the entry that is indicated as invalid by the per-portion state information.

19. The method of claim 15, further comprising:

setting a last-use indication for the entry in response to a last-use indication in an instruction that specifies an operand associated with the entry, wherein the last-use indication is a per-entry last-use indication that applies to the entire entry; and invalidating the entry by modifying the per-entry validity value for the entry, wherein the invalidating is performed in response to issuing operands from the entry to execution circuitry and is performed based on the per-entry last-use indication.

20. The method of claim 19, further comprising:

storing an indication of a latest instruction that hit the entry for a source operand, wherein the invalidating is further performed based on the indication.

\* \* \* \* \*